US009682518B2

(12) United States Patent
Thunhorst et al.

(10) Patent No.: US 9,682,518 B2
(45) Date of Patent: *Jun. 20, 2017

(54) NANOPARTICLE PULTRUSION PROCESSING AIDE (71) Applicant: 3M INNOVATIVE PROPERTIES COMPANY, St. Paul, MN (US)

(72) Inventors: Kristin L. Thunhorst, Stillwater, MN (US); Emily S. Goenner, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/886,949

(22) Filed: Oct. 19, 2015

(65) Prior Publication Data

US 2016/0039153 A1 Feb. 11, 2016

Related U.S. Application Data (62) Division of application No. 13/230,910, filed on Sep. 13, 2011, now Pat. No. 9,162,398.

(60) Provisional application No. 61/383,906, filed on Sep. 17, 2010.

(51) Int. Cl.
| | |
|---|---|
| *B32B 27/04* | (2006.01) |
| *B32B 27/20* | (2006.01) |
| *B29C 70/52* | (2006.01) |
| *C08J 5/06* | (2006.01) |
| *C08J 5/24* | (2006.01) |
| *B82Y 30/00* | (2011.01) |
| *C08J 5/00* | (2006.01) |
| *C08J 5/08* | (2006.01) |
| *C08J 5/04* | (2006.01) |
| *C08K 3/36* | (2006.01) |
| *C08K 9/00* | (2006.01) |
| *B29K 63/00* | (2006.01) |
| *B29K 505/00* | (2006.01) |
| *B29K 509/00* | (2006.01) |
| *B29K 707/04* | (2006.01) |

(52) U.S. Cl.
CPC ............ *B29C 70/52* (2013.01); *B29C 70/521* (2013.01); *B82Y 30/00* (2013.01); *C08J 5/005* (2013.01); *C08J 5/042* (2013.01); *C08J 5/06* (2013.01); *C08J 5/08* (2013.01); *B29K 2063/00* (2013.01); *B29K 2505/00* (2013.01); *B29K 2509/00* (2013.01); *B29K 2707/04* (2013.01); *B29K 2995/0078* (2013.01); *C08J 2363/00* (2013.01)

(58) Field of Classification Search
None
See application file for complete search history.

(56) References Cited

U.S. PATENT DOCUMENTS

| | | | | |
|---|---|---|---|---|
| 5,648,407 | A * | 7/1997 | Goetz | ........... C08K 9/04 523/213 |
| 5,681,513 | A * | 10/1997 | Farley | ........... B29B 11/04 156/148 |
| 6,045,898 | A | 4/2000 | Kishi et al. | |
| 6,228,474 | B1 | 5/2001 | Kishi et al. | |
| 6,656,302 | B2 | 12/2003 | Kishi et al. | |
| 7,114,319 | B2 | 10/2006 | Sakonjo et al. | |
| 9,145,627 | B2 * | 9/2015 | Wilson | ........... B29C 70/025 |
| 9,162,398 | B2 * | 10/2015 | Thunhorst | ........... B82Y 30/00 |
| 2002/0009581 | A1 | 1/2002 | Kishi et al. | |
| 2004/0035201 | A1 | 2/2004 | Vincze et al. | |
| 2005/0025967 | A1* | 2/2005 | Lawton | ........... C03C 25/00 428/375 |
| 2005/0129942 | A1 | 6/2005 | Hiel | |
| 2006/0167158 | A1 | 7/2006 | Yagi et al. | |
| 2008/0160286 | A1 | 7/2008 | Asrar | |
| 2009/0092832 | A1 | 4/2009 | Moireau | |
| 2010/0040886 | A1 | 2/2010 | Luinge | |
| 2010/0203328 | A1 | 8/2010 | Hochstetter | |
| 2011/0224329 | A1 | 9/2011 | Gong et al. | |
| 2011/0245376 | A1* | 10/2011 | Schultz | ........... C08L 63/00 523/400 |
| 2013/0167502 | A1 | 7/2013 | Wilson et al. | |

FOREIGN PATENT DOCUMENTS

| | | |
|---|---|---|
| EP | 1502727 | 2/2005 |
| GB | 2390605 | 1/2004 |
| JP | 61083651 | 4/1986 |
| JP | 2001-181406 | 7/2001 |
| JP | 2009061701 | 3/2009 |
| WO | WO 96/36665 | 11/1996 |
| WO | WO 00-47657 | 8/2000 |
| WO | WO 2005/040017 | 5/2005 |
| WO | WO 2006/006973 | 1/2006 |
| WO | WO 2006/006996 | 1/2006 |

(Continued)

OTHER PUBLICATIONS

ACMA, American Composites Manufacturers Association Technical Papers, Arlington, VA, Session #21, Advancement and Unique Pultrusion Processing Technologies, Session A, Koschmieder "Enhancing Pultrusion Throughput for Greater Profit"; (1999), pp. 1-4.

(Continued)

*Primary Examiner* — Michael J Feely
(74) *Attorney, Agent, or Firm* — Thomas M. Spielbauer; Philip P. Soo (57) ABSTRACT

The use of nanoparticles, including surface-modified silica and calcite nanoparticles, as processing aides for pultrusion is described. The methods include combining a resin system containing a resin and the nanoparticles with continuous fibers, pultruding this combination, and at least partially curing the resin. The methods are suitable for use with a wide variety of resins and fibers, and may be used to reduce the pull-force at a fixed fiber volume loading, increase the fiber volume loading, or both. Pultruded parts made by these methods and pultruded parts with high volume loadings of fibers are also described.

6 Claims, 2 Drawing Sheets

(56) References Cited

FOREIGN PATENT DOCUMENTS

| WO | WO 2006/006997 | | 1/2006 | |
|---|---|---|---|---|
| WO | WO 2007-011684 | | 1/2007 | |
| WO | WO 2009-120846 | | 10/2009 | |
| WO | WO 2010-078690 | | 7/2010 | |
| WO | WO 2010/080459 A1 | * | 7/2010 | ............... C08K 3/26 |
| WO | WO 2010-138440 | | 12/2010 | |
| WO | WO 2012/037046 | | 3/2012 | |

OTHER PUBLICATIONS

ACMA, American Composites Manufacturers Association Technical Papers, Arlington, VA, Session #21, Advancement and Unique Pultrusion Processing Technologies, Session B, Ding, "Simulation and Experimental Verification of Resin Flow and Cure in the Injection Pultrusion Process"; (1999), pp. 1-6.

ACMA, American Composites Manufacturers Association Technical Papers, Arlington, VA, Session #21, Advancement and Unique Pultrusion Processing Technologies, Session C, Engelen, "Experimental Comparison of Resin Injection Methods for Pultrusion", (1999), p. 1.

ACMA, American Composites Manufacturers Association Technical Papers, Arlington, VA, Session #21, Advancement and Unique Pultrusion Processing Technologies, Session D, Joshi, "Polyurethanes in Pultrusion: Styrene-Free Alternative Systems", (1999), pp. 1-6.

ACMA, American Composites Manufacturers Association Technical Papers, Arlington, VA, Session #21, Advancement and Unique Pultrusion Processing Technologies, Session E, Lackey, "Effects of Fillers on Pultrusion Processing and Pultruded Properties", (1999), pp. 1-10.

ASTM Designation: D 2344/D2344M-00, (Reapproved 2006), "Standard Test Method for Short-Beam Strength of Polymer Matrix Composite Materials and Their Laminates[1]" 2000, pp. 1-8.

Böger, "Improvement of fatigue life by incorporation of nanoparticles in glass fibre reinforced epoxy", Composites: Part A: Applied Science and Manufacturing, Elsevier Science Publishers, Amsterdam, NL, vol. 41, No. 10, Oct. 1, 2010, pp. 1419-1424.

Goodman, Handbook of Thermoset Plastics (Second Edition), William Andrew Publishing, (1998), p. 122.

Lackey, "An Analysis of Factors Affecting Pull Force for the Pultrusion of Graphite/Epoxy Composites", Journal of Reinforced Plastics and Composites, (Mar. 1994): vol. 13, pp. 188-198.

Li, "Experimental and Theoretical Analysis of Pulling Force in Pultrusion and Resin Injection Pultrusion (RIP)—Part I: Experimental", Journal of Composite Materials, Jan. 2003; vol. 37, No. 2, pp. 163-189.

Mississippi Pultrusion (Pultrusion Research Report of the University of Mississippi Composite Materials Research Group), Fall 1999/Winter 2000, 4 pages.

Srinivasagupta, "Analysis of Pull-Force in Injected Pultrusion", Unpublished Short Paper, Submitted to SAMPLE Journal of Advanced Materials, pp. 1-27.

International Search Report for Application No. PCT/US2011/051277, Date of Mailing Apr. 1, 2012, 4 pages.

* cited by examiner

NANOPARTICLE PULTRUSION PROCESSING AIDE

FIELD

The present disclosure relates to pultrusion processing aides. In particular, nanoparticle, including surface-modified nanoparticle, processing aides and the use of such nanoparticles in pultrusion processes are described.

SUMMARY

Briefly, in one aspect, the present disclosure provides a method of forming a fiber reinforced polymer composite comprising impregnating continuous fibers with a resin system comprising a liquid resin and nanoparticles, pulling the resin-impregnated fibers through a die, and at least partially solidifying (e.g., crosslinking) the resin system in the die. In some embodiments, the method further comprises pulling the resin-impregnated fibers through a preformer and debulking the fibers. Suitable fibers include aramid fibers, glass fibers, and carbon fibers. Suitable resins include crosslinkable resins such as epoxy resin, vinyl ester resin, and polyester resin.

In some embodiments, the nanoparticles comprise a core and at least one surface-modifying agent associated with the core, e.g., silica nanoparticles comprising a silica core and a surface modifying agent covalently bonded to the core and calcite nanoparticles comprising a calcite core and a surface-modifying agent ionically associated with the core. In some embodiments, the nanoparticles comprise reactive surface-modified nanoparticles comprising a core and reactive surface modifying agent associated with the core, wherein solidifying the resin comprises reacting the resin with the reactive surface modifying agent.

In some embodiments, the pull force required to form the fiber reinforced polymer composite is reduced by at least 30% relative to the pull force required to form the same fiber reinforced polymer composite at the same conditions but without the nanoparticles. In some embodiments, the pull force required to form the fiber reinforced polymer composite at a line speed of at least 20% greater than a base line speed is less than the pull force required to form the same fiber reinforced polymer composite at the base speed and without the nanoparticles.

In another aspect, the present disclosure provides a pultruded fiber reinforced polymer composite made according the method of any one of the preceding claims.

In yet another aspect, the present disclosure provides a pultruded fiber reinforced polymer composite comprising continuous fibers imbedded in a resin system comprising a cured resin and nanoparticles. In some embodiments, the pultruded fiber reinforced polymer composite comprising at least 66 volume percent of the continuous fibers. In some embodiments, the continuous fibers comprise graphite fibers and/or glass fibers.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Generally, "extrusion" involves the pushing of material through a barrel equipped with one or more heated screws that provide a significant amount of shear force and mixing before the material exits the barrel through, e.g., a die. In contrast, in a "pultrusion" process, materials are pulled through the die. Pultrusion is frequently used to form continuous, fiber reinforced polymer composites having a uniform cross-section. In a typical pultrusion process, continuous fibers and resin are pulled through a heated die where the composite part is shaped and the resin is hardened. The resulting fiber reinforced polymer composite can then be cooled and cut to the desired lengths to produce pultruded parts. Exemplary pultruded parts include poles, posts, handles, rods, tubes, beams, e.g., I-beams, decking, arrow shafts, struts, and the like.

Figure 1:
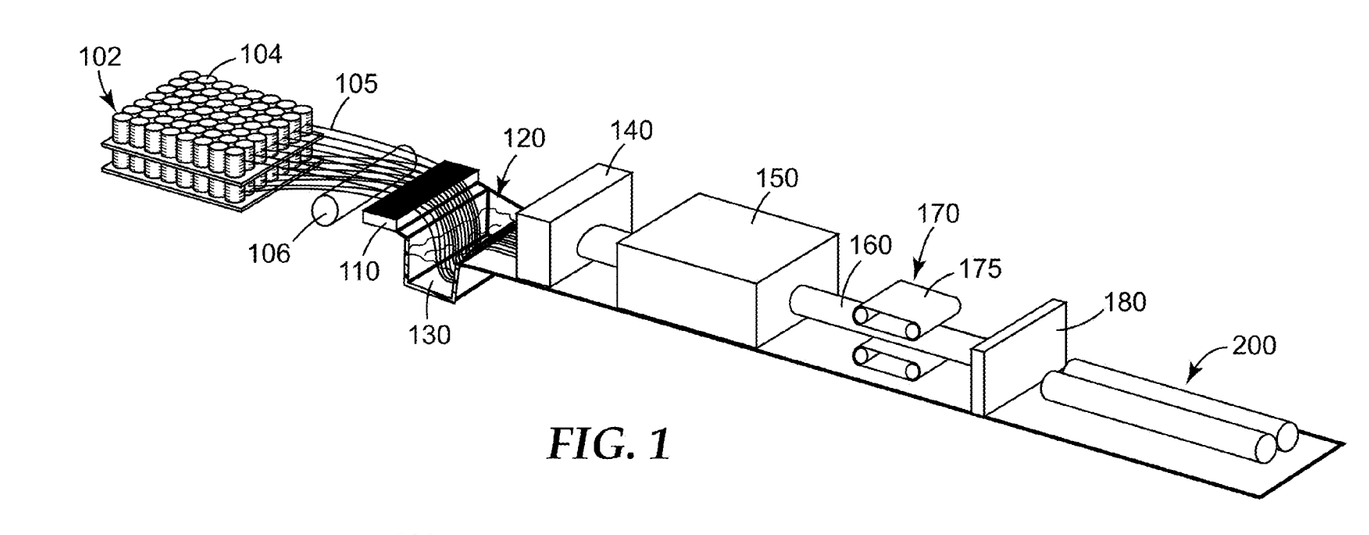
FIG. 1 illustrates an exemplary pultrusion process.

One exemplary pultrusion process is illustrated in FIG. 1. Reels 104 of fiber 105 are supported on, e.g., creel 102. Each fiber 105 is often a bundle of fibers, e.g., a tow or roving. Although not shown, the fibers can also be provided as a mat containing continuous and/or discontinuous fibers. In some embodiments, the fibers are combined with additional fibrous layers, e.g., continuous strand mat 106.

As the fibers are pulled through guide 110, they are aligned and distributed as desired for the particular pultruded part. Fibers 105 then enter the resin bath 120 where they are saturated or "wet-out" with the resin system 130. Upon exiting the resin bath, the fibers enter preformer 140 where the saturated flat fiber sheet is preshaped and, in a process referred to as "debulking," excess resin is removed.

In some embodiments, a continuous strand mat and/or surface veil may be applied after the resin bath to, e.g., improve the strength and/or surface properties of the pultruded part. Generally, the added surface veils are saturated with a portion of the excess resin as it squeezed from the saturated fibers in preformer 140. In some embodiments, a preheater, e.g., a radio frequency preheater, may be positioned between preformer 140 and die 150 to raise the temperature and lower the viscosity of the resin.

After alignment and debulking, the resin impregnated fibers are ready to pass through forming die 150. Generally, the die is precisely machined such that the fibers and resin are compacted to conform to the desired finished cross-section. Die 150 is typically heated in one or more zones to provide the temperature profile desired to cure or otherwise harden the resin system. Thus, the resin cures and undergoes a reduction in volume as the resin and fibers pass through the heated die.

In some embodiments, a preformer may not be present and debulking and saturation of any surface veils occurs at the entrance to the die. In addition, as the materials are not preformed, the conversion of the materials to their final shape occurs within the die.

After the cured, pultruded, fiber reinforced polymer ("FRP") composite 160 exits the die, it may be cooled or otherwise treated prior to entering "gripper" section 170. A wide variety of griping approaches have been used to continuously pull the materials through the pultrusion die including, e.g., caterpillar tracks 175, hydraulic clamps, reciprocating pull blocks, and the like. Following the gripper section, the FRP composite may be cut with, e.g., cut-off saw 180, to the desired lengths as finished parts 200.

Various modifications to this general description of pultrusion are well understood. For example, as an alternative to saturating the fibers in a resin bath, resin may be injected into the die in a process typically referred to as injected pultrusion. Generally, the fibers are unwound from a creel, aligned and distributed as desired, and passed through the die. Near the entrance to the die, resin is injected, and as the fibers are pulled through the resin injection area, the fibers are saturated, the resin is cured in the die, and a FRP composite is produced ready to be cut into parts.

Figure 2:
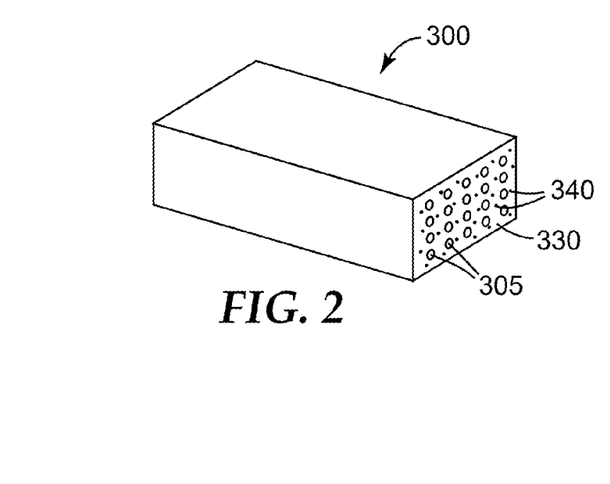
FIG. 2 illustrates an exemplary pultruded, fiber reinforced polymer composite.

Exemplary pultruded part 300 is illustrated in FIG. 2. Pultruded part 300 comprises fibers 305 and cured resin 330 containing well-dispersed nanoparticles 340. Generally, all fibers 305 are aligned in the length direction of the pultruded part. In addition to the exemplary rectangular cross-section illustrated in FIG. 2, any known or desired cross-section may produced by appropriate design of the die.

As in many manufacturing processes, there is a desire to increase the mechanical properties of pultruded parts. Typically, manufacturers attempt to achieve this by increasing the fiber volume fraction in the parts. However, as is well-known, even small increases in the fiber volume fraction can lead to significant increases in the pull force, i.e., the force required to pull the resin and fiber through the die. As processing speed and throughput are also critical, there are significant practical limitations on the maximum fiber loading that can be achieved.

Generally, the lower the fiber volume fraction in the composite, the greater the reduction in the volume of the composite part resulting from shrinkage of the resin during cure in the die. As the resulting composite part has reduced contact with the die surface, friction is reduced and a lower pull force is required. As the fiber volume increases, there is less resin, resulting in less shrinkage, more friction, and greater pull forces.

Resin viscosity also affects pull force. Generally, as the viscosity increases, greater pull forces are required. In some applications, the resin may be preheated prior to entering the die, in part to reduce its viscosity.

The present inventors have discovered that, in some embodiments, the inclusion of even small amounts of nanoparticles in the resin system can produce a dramatic and unexpected decrease in pull force at a fixed fiber loading. This effect can be used to increase the fiber volume loading and/or the processing speed without exceeding the maximum desirable pull force. These results are all the more surprising as the addition of nanoparticles to a resin system is known to both increase the viscosity and reduce the shrinkage, both of which generally increase the required pull force.

In addition to maintaining the pull force below some desired maximum value, it is also desirable to maintain a steady pull force. Often, sudden, or even gradual, increases in pull force indicate processing problems, usually at the entrance to, or within the die. This can lead to pauses in production as the die is cleaned or other variables are adjusted. Such temporary pauses or holds in the process can also cause spikes in the pull force as line movement is resumed. Thus, higher, stable pull forces may be more desirable then lower, unstable pull forces.

In some embodiments, the present inventors have discovered that the addition of even small amounts of nanoparticles can lead to a stable pull force. Although pull force reductions are most often desired, even when the average pull force is higher than a similar system without nanoparticles, the higher, yet stable, pull forces can be tolerated, providing greater flexibility in the selection of other parameters such a fiber volume loading, line speed, and resin viscosity.

Resin System. As used herein, the term "resin system" refers to the combination of the surface-modified nanoparticles, the resin component, and any additional elements such as hardeners, curatives, initiators, promoters, crosslinking agents, tougheners, and fillers (e.g., clay). As used herein, the term "resin component" refers collectively to resins and reactive diluents.

Resins. Generally, any known resin may be used in the various embodiments of the present disclosure. In some embodiments, a curable resin may be preferred. Generally, any known curable resin compatible with a pultrusion process may be used, including, e.g., epoxy resins, unsaturated polyester resins, and vinyl ester resins.

Epoxy resins are well-known in the art and comprise compounds or mixtures of compounds which contain one or more epoxy groups. The compounds can be saturated or unsaturated, aliphatic, alicyclic, aromatic, or heterocyclic, or can comprise combinations thereof. In some embodiments, compounds which contain more than one epoxy group (i.e., polyepoxides) are preferred.

Polyepoxides which can be used include, e.g., both aliphatic and aromatic polyepoxides, but aromatic polyepoxides may be preferred for high temperature applications. The aromatic polyepoxides are compounds containing at least one aromatic ring structure, e.g. a benzene ring, and more than one epoxy group. Exemplary aromatic polyepoxides include the polyglycidyl ethers of polyhydric phenols (e.g., bisphenol A derivative resins, epoxy cresol-novolac resins, bisphenol F derivative resins, epoxy phenol-novolac resins), glycidyl esters of aromatic carboxylic acids, and glycidyl amines of aromatic amines. Exemplary epoxy resins include those based on bisphenol A and bisphenol F, e.g., some of those available under the trade name EPON™ from Hexion Specialty Chemicals, Inc., Houston, Tex.

In some embodiments, the curable resin may be an ethylenically-unsaturated curable resin. For example, in some embodiments, an unsaturated polyester resin may be used. In some embodiments, the unsaturated polyester resin is the condensation product of one or more carboxylic acids or derivatives thereof (e.g., anhydrides and esters) with one or more alcohols (e.g., polyhydric alcohols).

In other embodiments, vinyl ester resins may be used. As used herein, the term "vinyl ester" refers to the reaction product of epoxy resins with ethylenically-unsaturated monocarboxylic acids. Exemplary epoxy resins include bisphenol A digycidal ether (e.g., EPON 828, available from Hexion Specialty Chemicals, Columbus, Ohio). Exemplary monocarboxylic acids include acrylic acid and methacrylic acid. Although such reaction products are acrylic or methacrylic esters, the term "vinyl ester" is used consistently in the gel coat industry. (See, e.g., Handbook of Thermoset Plastics (Second Edition), William Andrew Publishing, page 122 (1998).)

In still other embodiments, (meth)acrylate resins, including, e.g., urethane(meth)acrylates, polyethyleneglycol (multi)(meth)acrylates, and epoxy(multi)(meth)acrylates may be used. As used herein, the term (meth)acrylate refers to an acrylate and/or a methacrylate, i.e., ethyl(meth)acrylate refers to ethyl acrylate and/or ethyl methacrylate.

Reactive Diluents. Depending on the selection of the curable resin, in some embodiments, the resin system may also include a reactive diluent. Exemplary reactive diluents include styrene, alpha-methylstyrene, vinyl toluene, divinylbenzene, triallyl cyanurate, methyl methacrylate, diallyl phthalate, ethylene glycol dimethacrylate, hydroxyethyl methacrylate, hydroxyethyl acrylate, and other mono- and multi-functional (meth)acrylates.

Reactive diluents for epoxy resins include mono- and multi-functional, aliphatic and aromatic, glycidyl ethers including, e.g., some of those available under the trade name HELOXY from Hexion Specialty Chemicals, Columbus, Ohio. Exemplary reactive diluents include, e.g., trimethylol propane trigylcidyl ether, 1,4-butane diol diglycidyl ether, neopentyl glycol diglycidyl ether, n-butyl glycidyl ether, 2-ethylhexyl glycidyl ether, p-tertiary butyl phenyl glycidyl ether, phenyl glycidyl ether, and cyclohexane dimethanol diglycidyl ether.

Surface Modified Nanoparticles. Generally, "surface modified nanoparticles" comprise surface treatment agents attached to the surface of a core. In some embodiments, the core is substantially spherical. In some embodiments, the cores are relatively uniform in primary particle size. In some embodiments, the cores have a narrow particle size distribution. In some embodiments, the core is substantially fully condensed. In some embodiments, the core is amorphous. In some embodiments, the core is isotropic. In some embodiments, the core is at least partially crystalline. In some embodiments, the core is substantially crystalline. In some embodiments, the particles are substantially non-agglomerated. In some embodiments, the particles are substantially non-aggregated in contrast to, for example, fumed or pyrogenic silica.

As used herein, "agglomerated" is descriptive of a weak association of primary particles usually held together by charge or polarity. Agglomerated particles can typically be broken down into smaller entities by, for example, shearing forces encountered during dispersion of the agglomerated particles in a liquid. In general, "aggregated" and "aggregates" are descriptive of a strong association of primary particles often bound together by, for example, residual chemical treatment, covalent chemical bonds, or ionic chemical bonds. Further breakdown of the aggregates into smaller entities is very difficult to achieve. Typically, aggregated particles are not broken down into smaller entities by, for example, shearing forces encountered during dispersion of the aggregated particles in a liquid.

Silica nanoparticles. In some embodiments, the nanoparticles comprise silica nanoparticles. As used herein, the term "silica nanoparticle" refers to a nanoparticle having a core with a silica surface. This includes nanoparticle cores that are substantially entirely silica, as well nanoparticle cores comprising other inorganic (e.g., metal oxide) or organic cores having a silica surface. In some embodiments, the core comprises a metal oxide. Any known metal oxide may be used. Exemplary metal oxides include silica, titania, alumina, zirconia, vanadia, chromia, antimony oxide, tin oxide, zinc oxide, ceria, and mixtures thereof. In some embodiments, the core comprises a non-metal oxide.

Commercially available silicas include those available from Nalco Chemical Company, Naperville, Ill. (for example, NALCO 1040, 1042, 1050, 1060, 2326, 2327 and 2329); Nissan Chemical America Company, Houston, Tex. (e.g., SNOWTEX-ZL, -OL, -O, -N, -C, -20L, -40, and -50); and Admatechs Co., Ltd., Japan (for example, SX009-MIE, SX009-MIF, SC1050-MJM, and SC1050-MLV).

Surface Treatment Agents for silica nanoparticles. Generally, surface treatment agents for silica nanoparticles are organic species having a first functional group capable of covalently chemically attaching to the surface of a nanoparticle, wherein the attached surface treatment agent alters one or more properties of the nanoparticle. In some embodiments, surface treatment agents have no more than three functional groups for attaching to the core. In some embodiments, the surface treatment agents have a low molecular weight, e.g. a weight average molecular weight less than 1000 gm/mole.

In some embodiments, the surface-modified nanoparticles are reactive; that is, at least one of the surface treatment agents used to surface modify the nanoparticles of the present disclosure may include a second functional group capable of reacting with one or more of the curable resin(s) and/or one or more of the reactive diluent(s) of the resin system. For purposes of clarity, even when the nanoparticles are reactive, they are not considered to be constituents of the resin component of the resins system.

Surface treatment agents often include more than one first functional group capable of attaching to the surface of a nanoparticle. For example, alkoxy groups are common first functional groups that are capable of reacting with free silanol groups on the surface of a silica nanoparticle forming a covalent bond between the surface treatment agent and the silica surface. Examples of surface treatment agents having multiple alkoxy groups include trialkoxy alkylsilanes (e.g., 3-(trimethoxysilyl)propyl methacrylate) and trialkoxy arylsilanes (e.g., trimethoxy phenyl silane).

In some embodiments, the nanoparticles comprise calcite nanoparticles. Calcite is the crystalline form of calcium carbonate and typically forms rhombohedral crystals. In some embodiments, at least 70%, e.g., at least 75% of the calcite cores have an average size of less than 400 nm. In some embodiments, at least 90%, in some embodiments, at least 95%, or even at least 98% of the calcite cores have an average size of less than 400 nm.

Surface-modifying agents for calcite nanoparticles. Generally, the surface-modifying agents include at least a binding group and a compatiblizing segment:

Comp. Seg.-Binding Group;

wherein "Comp. Seg." refers to the compatiblizing segment of the surface-modifying agent.

The compatiblizing segment is selected to improve the compatibility of the calcite nanoparticles with the curable resin. Generally, the selection of the compatiblizing group depends on a number of factors including the nature of the curable resin, the concentration of the nanoparticles, and the desired degree of compatibility. For epoxy resin systems, useful compatiblizing agents include polyalkylene oxides, e.g., polypropylene oxide, polyethylene oxide, and combinations thereof.

The binding group bonds to the calcite, connecting the surface-modifying agent to the calcite core. Unlike many silica-based nanoparticle systems wherein the surface-modifying agents are covalently bonded to the silica, the surface-modifying agents of the present disclosure are ionically bonded to (e.g., associated with) the calcite.

In order to retain the surface-modifying agents with the calcite cores during processing of the compositions, it may be desirable to select binding groups having high bond energies to calcite. Bond energies can be predicted using density functional theory calculations. In some embodiments, the calculated bond energies may be at least 0.6, e.g., at least 0.7 electron volts. Generally, the greater the bond energy the greater the likelihood that the binding group will remain ionically associated with the particle surface. In some embodiments, bond energies of at least 0.8, e.g., at least 0.9, or even at least 0.95 electron volts, may be useful.

In some embodiments, the binding group comprises a phosphonic acid and/or a sulfonic acid. In some embodiments, the surface-modifying agent also comprises a reactive group, i.e., a group capable of reacting with the curable resin, e.g., during the curing process. This can result in the nanocalcite particle being strongly bonded into the resin matrix and may lead to an improvement in the physical properties of the resulting cured nanocomposite. Generally, the reactive group is selected based on the nature of the curable resin. In some embodiments, the reactive group may be located on the end of the compatiblizing segment:

In some embodiments, a linking group is present connecting the compatiblizing segment with the binding group:

Comp. Seg.-Linking Group-Binding Group.

For example, in some embodiments, the surface-modifying agent comprises a polyetheramine. Exemplary polyetheramines include those available under the trade name JEFFAMINE® available from Huntsman Corporation, The Woodlands, Tex. The polyether serves as a compatiblizing segment, while the amine is the linking group linking the compatiblizing segment with the binding group.

In some embodiments, the surface-modifying agent comprises a zwitterion, i.e., a compound carrying a net charge of zero, but which is capable of carrying a formal positive and negative charge on different atoms. In some embodiments, the formal negative charge is carried by the binding group. In some embodiments, the formal positive charge is carried on the nitrogen atom of an amine, e.g., an amine linking group. In such embodiments, the amine may serve as both the linking group and the reactive group.

Multimodal Particle Size Distributions.

In some embodiments, the nanoparticles are selected to achieve a multimodal particle size distribution. Generally, a multimodal distribution is distribution having two or more modes, i.e., a bimodal distribution exhibits two modes, while a trimodal distribution exhibits three modes.

In some embodiments, the multimodal distribution of the surface-modified nanoparticles has a first mode (as determined by TEM) having a number average particle size of between 50 and 250 nanometers (nm), inclusive. In some embodiments, the average particle size of the first mode is at least 50 nm, at least 60 nm, or even at least 70 nm. In some embodiments, the average particle size of the first mode ("D1") is no greater than 150 nm, e.g., no greater than 100 nm, or even no greater than 80 nm.

In some embodiments, the multimodal distributions of the surface-modified nanoparticles have a second mode. The number average diameter of the nanoparticles in the second mode is less than the average diameter of the nanoparticles in the first mode. In some embodiments, the average particle size of the second mode, D2, is no greater than 50 nm, e.g., no greater than 30 nm, no greater than 20 nm, no greater than 15 nm, or even no greater than 10 nm. In some embodiments, D2 is at least 3 nm, e.g., at least 5 nm, e.g., at least 10 nm, or even at least 20 nm. In some embodiments, D2 is between 3 and 10 nm, inclusive. In some embodiments, D2 is between 20 and 50 nm, inclusive.

Fibers. Generally, any fibers suitable for use in fiber reinforced polymer composites may be used. Exemplary fibers include carbon (e.g., graphite) fibers, glass fibers, ceramic fibers, boron fibers, silicon carbide fibers, polyimide fibers, polyamide fibers, and polyethylene fibers. Combinations of materials may also be used. Generally, the form of the fibers is not particularly limited. Exemplary fiber forms include unidirectional arrays of individual continuous fibers, yarn, roving, and braided constructions. Woven and non-woven mats may also be included.

In some embodiments, resin systems of the present disclosure also include any number of well-known additives. Exemplary additives include hardeners, curatives, initiators, promoters, crosslinking agents, tougheners, and fillers (e.g., clay). Generally, large fillers having an average particle size of at least 1 micrometer, e.g., at least 2 micrometers, or even at least 5 micrometers, may be used.

EXAMPLES

TABLE 1

Summary of materials

| Description | Source |
| --- | --- |
| EPON 826 bisphenol-A epoxy resin | Hexion Specialty Chemicals |
| EPON 828 bisphenol-A epoxy resin | Hexion Specialty Chemicals |
| HELOXY 107 epoxy resin | Hexion Specialty Chemicals |
| ASHLAND 1398-5 vinyl ester resin Styrene | Ashland Chemical Co. |
| NALCO 2326 silica sol (5 nm) | NALCO Chemical Co. |
| NALCO 2329K silica sol (70-95 nm) | NALCO Chemical Co. |
| NALCO TX10693 silica sol (15-95 nm; mean 75 nm) | NALCO Chemical Co. |
| SOCAL 31 calcite | Solvay |
| HUBERCARB Q6 calcite (6 microns) | Huber Engineered Materials |
| ASP400 kaolin clay filler | BASF Corporation |
| LS81K anhydride curative | Lindau Chemicals, Inc. |
| 3-(trimethoxysilyl)propyl methacrylate (A174) | |
| Polyalkyleneoxide alkoxysilane (SILQUEST A1230) | Momentive Performance Chem. |
| Trimethoxy phenyl silane | Gelest, Inc. |
| PERKADOX-16 initiator ("P-16") | Akzo Nobel Polymer Chemicals |
| TRIGONOX 121BB75 initiator ("T-121") | Akzo Nobel Polymer Chemicals |
| TRIGONOX C initiator ("T-C") | Akzo Nobel Polymer Chemicals |
| INT-PUL24 mold release ("I-P-24") | AXEL Plastics Research Laboratories, Inc. |

Test Procedures

Particle Size Procedure. The particle size of the nanoparticles was measured by laser diffraction using a HORIBA LA-950. The nanoparticle dispersion was diluted to approximately 1% solids with acetone. The sample was then added to the measurement cell, which was filled with acetone, until the transmittance was between the recommended levels of 85% to 95%. The optical model for the calculation used a refractive index of 1.6000 for calcite and 1.3591 for acetone, and assumed spherical particles. The second differential method was used for smoothing and was based on 150 iterations. The reported values of particle size were based on volume fraction averages and static light scattering.

Gas Chromatography (GC) Procedure. Gas chromatography was used to analyze for residual solvents. Gas chromatography was run using an AGILENT 6890N gas chromatograph equipped with an HP-5MS column ((5% phenyl)-methylpolysiloxane having a length of 30 meters and an inside diameter of 320 micrometers (both the chromatograph and column are available from Agilent Technologies, Incorporated, Santa Clara, Calif.)). The following parameters were employed: a 1 microliter aliquot of a 10% sample solution (in GC grade tetrahydrofuran) was injected; split inlet mode set at 250° C., 9.52 psi and a total inlet flow of 111 mL/min; column constant pressure mode set at 9.52 psi; velocity was set at 34 centimeters/second; total gas flow was 2.1 mL/min; detector and injector temperatures were 250° C.; and a temperature sequence of equilibration at 40° C. for 5 minutes followed by a ramp rate of 20° C./minute to 260° C. A thermoconductivity detector was used.

Thermogravimetric Analysis Procedure. The silica or calcite content of the resin systems was measured using thermogravimetric analysis. Samples were analyzed using a TA Instruments Model Q500 TGA and its associated software (available from TA Instruments, New Castle, Del.) employing a temperature ramp rate of 20 degrees Celsius (° C.)/minute from 35° C. to 900° C., in air. For silica-containing samples, the weight of sample (as a percentage of initial weight) remaining at 850° C. was taken as the weight percent of incombustible material and is reported as the weight percent of the product that is silica solids. For calcite-containing samples, the residual weight was assumed to be the CaO remaining in the sample after volatilizing all organics and carbon dioxide from the calcite. The calcite concentration in the original sample was calculated by dividing the weight percent CaO residue by 0.56.

Viscosity Procedure. Resin viscosity was measured using a Brookfield DVII (Brookfield, Middleboro, MA) with a RV spindle #4 at 20 rpm. Viscosity is reported in Pascal-seconds.

Surface-modified silica nanoparticles were prepared by placing 1157 grams of NALCO 2326 silica nanoparticle sol (16.1 wt. % of 5 nm silica in an aqueous dispersion) in a glass container. In a separate container, 2265 grams of 1-methoxy-2-propanol and, 64.5 grams of trimethoxyphenyl silane were added while stirring. The 1-methoxy-2-propanol mixture was added over a period of approximately 5 minutes to the NALCO 2326 sol with continuous stirring. The resulting uniform solution was heated in an oven at 80° C. for 16 hours. This process was repeated several times and combined into one batch. The resulting sol (SOL-1) contained 5.3 weight percent surface-modified silica in a blend of water and methoxypropanol.

Additional surface-modified silica nanoparticles were prepared by placing 1.689 parts by weight of NALCO 2329K silica nanoparticle sol nanoparticle sol (40.8 wt. % of 70-95 nm silica in an aqueous dispersion) in to an open head stainless steel mixing vessel and 1 part by weight 1-methoxy-2-propanol was added slowly while agitating. Then, 0.0197 parts by weight of trimethoxyphenyl silane was slowly added to the mixture. The mixture was allowed to agitate with a pneumatically-driven impeller for 30 minutes.

Hydrothermal Reactor Procedure. A 27 liter continuous flow hydrothermal reactor, such as described in PCT Publication number WO2009/120846 A2 was used to surface functionalize the silica particles. The 27 liter hydrothermal reactor had 18.3 meters of 1.27 cm outer diameter (OD); 1.09 cm inner diameter (ID)) stainless steel tubing, followed by 12.2 meters of 0.95 cm OD; 0.77 cm ID) stainless steel tubing, followed by 198.1 meters of 1.27 cm ID PTFE smooth bore inner tube with a high strength 304 stainless steel braided exterior. The oil temperature in the hydrothermal reactor was maintained at 155° C., and the TESCOM backpressure regulator (TESCOM, Elk River, MN) was maintained at 2.14 MPa (310 psig). A diaphragm pump (LDC1 ECOFLOW, American Lewa, Holliston, Mass.) was used to control the flowrate, and thus the residence time, such that a flowrate of 770 ml/min through the hydrothermal reactor was obtained, providing a residence time of 35 minutes. The effluent from the continuous flow hydrothermal reactor was collected in a HDPE drum. The resulting sol (SOL-2) contained 25.4 weight percent surface-modified silica in a blend of water and methoxypropanol.

A first resin system ("RS-1") was prepared by combining 14.6 kg EPON 828 epoxy resin with 3.6 kg HELOXY 107 epoxy resin.

A second resin system ("RS-2") was prepared by adding 12.4 kg SOL-1, 90.9 kg of SOL-2, 19.1 kg EPON 826 epoxy resin, 4.8 kg HELOXY 107 epoxy resin, and 16.9 kg methoxypropanol to a 380 Liter kettle with agitation forming a feed mixture. The kettle was kept at 25° C. and the components were agitated for a minimum of 14 hours.

WFE Procedure. The mixture was metered to the top entrance of a Wiped Film Evaporator (WFE) as described in U.S. Provisional Application No. 61/181,052 (filed 26 May 2009; Attorney Docket No. 65150US002), using a 1 square meter BUSS FILTRUDER counter current polymer processing machine, using a BLB series rotary external spur gear, and a chemical duty gear pump (Zenith Pumps, Sanford, NC). The WFE rotor, a BUSS Filmtruder-type, was set at a speed of 340 rpm with a 25 Horsepower drive. Vacuum was applied at a level of 2.6 to 2.8 kPa. The feed mixture was fed at a rate of 69 kg/hour and had steam zone temperatures as follows: Zone 1 108° C., Zone 2 108° C., Zone 3 150° C., and Zone 4 134° C. The resulting product, RS-2 had a temperature of 121° C. at the exit of the WFE. RS-2 resin system had a silica content of 49.4 wt % as determined by TGA, of which 97 wt. % of the surface-modified nanoparticles were derived from SOL-2 (70-95 nm) and 3 wt. % were derived from SOL-1 (5 nm)).

A third resin system ("RS-3") was prepared by combining 20.68 kg SOL-1, 3.81 kg of RS-1 resin, and approximately 1 kg 1-methoxy-2-propanol. The mixture was stripped to remove water and 1-methoxy-2-propanol to a concentration of 9.8 wt. % of 1-methoxy-2-propanol (and no remaining water) using rotary evaporation (vacuum and gentle heating). The mixture was then run on a Rolled Film Evaporator (RFE) (Chem Tech Inc, Rockdale, Ill., USA) which had a 0.06 $m^2$ surface area, internal condenser, and a stainless steel jacket. The partially-stripped sample from the rotary evaporator was placed in a glass container from which it was pumped to the RFE with a peristaltic pump (Masterflex L/S, Cole-Parmer Instrument Company, Vernon Hills, Ill., USA) at a rate of 18 grams/minute. The RFE jacket was maintained at a temperature of 150° C. and the system was under a vacuum of approximately 2500 Pascals. The product discharge line was maintained at a temperature of 120° C. The condenser temperature was maintained at −10° C. The rotor was operated at a rate of 354 rpm. The output from the RFE (RS-3) consisted of epoxy and well-dispersed functionalized nanoparticles, and no methoxypropanol (measured by GC). The final concentration of surface-modified nanoparticles in RS-3 (as measured by TGA) was 23.1 wt. %.

A series of experimental resin systems were prepared by combining various amounts of resin systems RS-1, RS-2, and RS-3 as summarized in Table 2.

TABLE 2

| | Experimental resin systems (amounts in kg). | | | | | |
|---|---|---|---|---|---|---|
| I.D. | RS-1 resin | RS-2 resin | RS-3 resin | LS-81K curative | Wt. % nanoparticles | Viscosity (Pa · sec) |
| R-EX1 | — | 2.50 | — | 1.29 | 32.6 | 3.47 |
| R-EX2 | 1.11 | 1.25 | — | 1.74 | 15.0 | 1.04 |
| R-EX3 | 1.27 | 0.30 | — | 1.40 | 4.9 | 0.75 |
| R-EX4 | 1.34 | 0.28 | — | 1.33 | 0.5 | 0.60 |
| R-EX5 | 0.87 | — | 0.60 | 1.30 | 5.0 | 0.85 |

A typical pultrusion resin system ("R-REF1") was prepared by combining 1.18 kg EPON 828 epoxy resin, 1.12 kg LS81K anhydride curative, and 0.12 kg ASP400 clay.

A control resin without nanoparticles ("R-CTL1") was prepared by combining 0.97 kg of RS-1 resin, 0.95 kg of LS-81K curative, and 0.10 kg of ASP400 clay. The resulting resin system contained 5.0 wt. % clay and had a viscosity of 0.58 Pa·sec.

Pultrusion Process. Pultrusion experiments were conducted on a commercial pultrusion machine. Sixty-eight tows of 12K graphite fiber (GRAFIL 34-700 fiber from Grafil Inc.) were mounted on a creel with no bearings and no external tensioning device. As summarized in Table 3, 58 to 68 tows graphite fiber were pulled from the creel and guided into an open liquid resin bath containing a resin system. The wet fibers were pulled through a die, with debulking occurring at the entrance to the die. The gripping section consisted of reciprocating pull blocks used to pull the resulting fully-cured, fiber reinforced polymer composite at a line speed of 38.1 cm per minute. Finished parts were cut to length with a cutting saw.

The die was 91 cm long and had a rectangular cross-section measuring 1.32 cm wide by 0.33 cm high. The die had a first heating zone set at 160° C. followed by a second zone set at 182° C. The exotherm that occurred during curing of the resin contributed to the temperature in the process as, e.g., the temperature of the composite part was 168° C. as measured between the heating zones.

The die was supported on a portion of the frame of the pultrusion line, but was not rigidly attached to the frame. As the materials were pulled through the die, the die moved in the direction of pull and was forced against a load cell registering the pull force. The pull force results are summarized in Table 3. With this equipment and die geometry, a steady pull force of no greater than about 160 kg force was desired, as greater pull forces tended to result in erratic performance including sudden increases in pull force and line stoppage. In general, narrow variations in pull force were indicative of a process in control, while large variations indicated an unstable process. Thus, although material can be processed for a short time at higher pull forces, such high pull forces may not be sustainable and may be impractical for production. In general, for any particular resin system, experiments were run at increasing fiber loadings until maximum fiber loading level was reached as indicated by a stable process at an acceptable maximum pull force.

which included a typical clay filler as well as a reactive diluent to reduce the resin viscosity to 0.58 Pa·sec, no more than 60 tows could be included. However, even at only 60 tows, the process was unstable and the pull force was erratic, spiking at 529 kg force. At 58 tows, the pull force was still a little erratic with a maximum pull force of 167 kg force.

In contrast, with the R-EX4 resin system, which had a viscosity nearly identical to that of the R-CTL1 resin, the pull force at 66 tows was only 107 kg force and was stable. Thus, by including as little as 0.5 wt. % silica, the tow count could be increased by almost 14% (66 tows versus 58 tows) while simultaneous reducing the maximum pull force by over 35% (107 kg versus 167 kg) relative to the R-CTL1 sample. In fact, by including surface-modified silica nanoparticles in the resin system, a fiber volume fraction of greater than 70 vol. % could be loaded into the pultruded part with stable pull forces as low as 211 kg force. Even at pull forces exceeding the desired maximum of 160 kg, the pull forces were stable indicating a well-controlled process.

Using the same procedure, an additional pultrusion test was run using the R-EX4 resin system (0.5 wt. % silica nanoparticles) and 64 tows of fiber. The line speed was increased to 45.7 cm/min. The resulting pull force was only 99 to 119 kg force, demonstrating that nanoparticles can be used as a processing aide to increase both the fiber loading and the line speed, simultaneously.

Preparation of Surface-Modifying Ligands for Calcite Nanoparticles.

A first polyetheramine sulfonate ligand (JAS ligand A) was prepared as follows. To 100 parts of polyetheramine (JEFFAMINE M-600 obtained from Huntsman, Mn=600) was added 17.88 parts of melted propane sultone (purchased from TCI America). The mixture was heated to 80° C. and stirred for 16 hours. 1H NMR spectra shows complete consumption of the propane sultone. The sulfonic acid ligand was isolated as a red brown liquid and used without further purification.

A second polyetheramine sulfonate ligand (JAS ligand B) was prepared as follows. To 3.78 kg (6.3 mol) of polyetheramine (JEFFAMINE M-600 obtained from Huntsman, Mn=600) at 40° C. was added 0.769 kg (6.3 mol) of melted 1,3-propane sultone (purchased from HBC Chem, USA) in two portions. Upon introduction of the propane sultone, the

TABLE 3

Epoxy resin systems with a surface-modified silica nanoparticle processing aide.

| | | | Fiber tow count (12K) | | | | | |
|---|---|---|---|---|---|---|---|---|
| | | | 58 | 60 | 62 | 64 | 66 | 68 |
| | | | Fiber vol. % (wet basis) | | | | | |
| | | | 60.1% | 62.2% | 64.3% | 66.4% | 68.4% | 70.5% |
| Resin system | Silica wt. % | Visc. Pa · sec | Pull Force (kg force) | | | | | |
| R-REF1 | 0 (*) | 1.58 | 174 | 133 | 150-163 | — | — | — |
| R-CTL1 | 0 (*) | 0.58 | 92-167 | 80-529 | — | — | — | — |
| R-EX1 | 32.6 | 3.47 | — | — | 54-90 | 84 | 113-181 | — |
| R-EX2 | 15.0 | 1.04 | — | — | 76 | 75 | 164-176 | 318-331 |
| R-EX3 | 4.9 | 0.75 | — | — | 59-64 | 62-88 | 103-106 | 210-211 |
| R-EX4 | 0.5 | 0.60 | 35-40 | 45 | 46-59 | 63-80 | 107 | 240-245 |
| R-EX5 | 5.0 | 0.85 | — | — | 57-104 | 83-88 | 139-142 | — |

(*) R-REF1 and R-CTL1 contain 5.0 wt. % clay.

As shown in Table 3, at a line speed of 38.1 cm/minute, the maximum fiber loading using the reference resin was 62 tows of the 12K graphite fibers, which is typical of many commercial pultrusion operations. With the control resin, reaction exotherms to 115° C. The mixture was allowed to cool to 90° C., and held at 90° C. with stirring for 4 hours. After 4 hours, 0.031 kg of cyclohexylamine (0.31 mol, purchased from Alfa Aesar) was added. The mixture was stirred for an additional one hour. 1H NMR spectra shows no residual propane sultone. The sulfonic acid ligand was isolated as a red brown liquid and used without further purification.

Calcite Nanoparticles in an Epoxy Resin.

A curable epoxy resin (106.7 kg of EPON 828), was placed in a stainless steel container. JAS ligand B (15 kg) was preheated to 90° C. for ease of handling, and added to the container. A D-Blade (Hockmeyer Equipment Corporation, Elizabeth City, N.C.) was lowered into the container and mixing was initiated. Nanocalcite (200 kg of SOCAL 31) was then added to the container gradually and mixing continued until a uniform mixture was produced. The mixture was transferred to a jacketed kettle.

A basket mill (also known as an immersion mill) was lowered into the kettle. The basket mill was a HCNS-5 Immersion Mill (Hockmeyer, Harrison, N.J.) containing 4.4 L of 0.3 mm yttrium-stabilized zirconia beads. The mill was run at speeds up to 969 rpm and a 0.1 mm separation screen was used. The mill was run for 6 hours and 30 minutes.

The resulting surface-modified nanoparticles were dispersed in the resin system and had a mean particle size of 265 nm, and a peak particle size of 296 nm, as measured by the Calcite Particle Size Procedure. The particle analysis showed a narrow particle size distribution with nearly all (at least 98 vol. %) of the particles within this peak. TGA measured 62.8 wt. % calcite in the resin.

A resin system ("RS-4") was prepared by combining the above nanocalcite milled resin (16 kg) with EPON 828 epoxy resin (2.02 kg) and HELOXY 107 epoxy resin (1.79 kg) and mixed with a Cowles mixer (DISPERMAT CN-10, BYK-Gardner, Columbia, Md., USA) until the mixture was homogenous. TGA measured 50.7 wt. % calcite in the resin system.

Another resin system ("RS-5") was prepared by combining 80 parts by weight EPON 828 epoxy resin and 20 parts by weight HELOXY 107 epoxy resin.

A series of experimental resin systems were prepared by combining various amounts of resin systems RS-4, RS-5 the LS81K anhydride curative, as summarized in Table 4.

TABLE 4

Experimental resin systems (amounts in kg).

| I.D. | RS-4 | RS-5 | LS81K curative | Wt. % nanoparticles | Viscosity (Pa · sec) |
|---|---|---|---|---|---|
| R-EX6 | 2.50 | 0 | 1.12 | 35 | 3.0 |
| R-EX7 | 1.02 | 0.71 | 1.15 | 18 | 1.10 |
| R-EX8 | 0.45 | 1.12 | 1.30 | 8 | 0.73 |
| R-EX9 | 0.04 | 1.82 | 1.80 | 0.5 | 0.68 |

Pultrusion experiments were conducted according the Pultrusion Process with a line speed of 38.1 cm/min. The results obtained using the R-REF1, R-CTL1 resin systems as well the experimental resin systems R-EX6 through R-EX9 are summarized in Table 5.

TABLE 5

Epoxy resin systems with a surface-modified calcite processing aide.

| | | | Fiber tow count | | | | |
|---|---|---|---|---|---|---|---|
| | | | 58 | 60 | 62 | 64 | 66 |
| | | | Fiber vol. % (wet basis) | | | | |
| | Calcite | Visc. (Pa · sec) | 60.1% | 62.2% | 64.3% | 66.4% | 68.4% |
| Resin | wt. % | | Pull Force (kg force) | | | | |
| R-REF1 | 0 | 1.58 | 174 | 133 | 150-163 | — | — |
| R-CTL1 | 0 | 0.58 | 92-167 | 80-529 | — | — | — |
| R-EX6 | 35 | 3.0 | — | — | 424-586 | — | — |
| R-EX7 | 18 | 1.10 | 75-121 | 86-108 | 101-142 | — | — |
| R-EX8 | 8 | 0.73 | — | 62-93 | 94-120 | 169-286 | — |
| R-EX9 | 0.5 | 0.68 | — | 44-52 | 66-68 | 98-171 | 209-685 |

Using the same procedure, additional pultrusion tests were run using the R-EX9 resin system (0.5 wt. % calcite nanoparticles) and 60 tows (62.2 vol. %) of the 12K graphite fiber. As summarized Table 6, calcite nanoparticles can be used as a processing aide to increase both the fiber loading and the line speed, simultaneously.

TABLE 6

Line speed increase using a surface-modified calcite processing aide.

| Resin | Calcite (wt. %) | Tows 12K | Fiber Vol. % | Speed (cm/min) | Pull Force (kg force) |
|---|---|---|---|---|---|
| R-EX9 | 0.5 | 60 | 62.2 | 38.1 | 44-52 |
| R-EX9 | 0.5 | 60 | 62.2 | 45.7 | 67-91 |
| R-EX9 | 0.5 | 60 | 62.2 | 53.3 | 80-116 |

Additional samples containing surface-treated calcite were conducted using larger calcite particles were prepared as follows. Curable epoxy resins (96 kg of EPON 828 and 24 kg of Heloxy 107), were placed in a stainless steel container. JAS ligand A (13.5 kg) was preheated to 90° C. for ease of handling, and added to the container. A Cowels blade (Dispermat CN-10, BYK-Gardner, Columbia, Md., USA) was lowered into the container and mixing was started. Nanocalcite (180 kg of SOCAL 31) was then added to the container gradually and mixing continued until a uniform mixture was produced. The mixture was transferred to a jacketed kettle.

A basket mill (also known as an immersion mill) was lowered into the kettle. The basket mill was a HCNS-5 Immersion Mill (Hockmeyer, Harrison, N.J.) containing 4.4 L of 0.5-0.7 mm yttrium-stabilized zirconia beads. The mill speed was set to 955-1273 rpm and a 0.27 mm separation screen was used. The mill was run for 13 hours and 23 minutes.

The resulting surface-modified nanoparticles were dispersed in the resin system and had a mean particle size of 385 nm, and a peak particle size of 296 nm. The particle analysis showed a narrow particle size distribution with nearly 82% of the particles within this peak. TGA measured 57.6 wt. % calcite in resin.

Resin system "RS-6" was prepared by combining the above nanocalcite milled resin (16 kg) with EPON 828 epoxy(1.744 kg) and HELOXY 107 epoxy (0.436 kg) and mixed with a Cowles mixer (Dispermat CN-10, BYK-Gardner, Columbia, Md., USA) until the mixture was homogenous. TGA measured 50.7 wt. % calcite in the resin system.

Curable epoxy resins (1600 g of EPON 828 and 400 g of HELOXY 107) were placed in a stainless steel container.

DISPERBYK-111 dispersant (225 g) was added to the container. A Cowles mixer (Dispermat CN-10, BYK-Gardner, Columbia, Md., USA) was lowered into the container and mixing was started. Nanocalcite (3000 g of SOCAL 31) was then added to the container gradually and mixing continued until a uniform mixture was produced. The mixture was transferred to a jacketed kettle.

A basket mill (also known as an immersion mill) was lowered into the kettle. The basket mill was a HCP-1/4 Immersion Mill (Hockmeyer, Harrison, N.J.) containing 150 milliliters of 0.5 mm yttrium-stabilized zirconia beads. The mill speed was set to its maximum setting of "10," and a 0.2 mm separation screen was used.

The resulting surface-modified nanoparticles were dispersed in the resin system and had a mean particle size of 285 nm, and a peak particle size of 296 nm as measured by the Particle Size Procedure. The particle analysis showed a narrow particle size distribution with nearly all (at least 98%) of the particles within this peak. TGA measured 57.2 wt. % calcite in the resin.

Resin system "RS-7" was prepared by combining the above nanocalcite milled resin (3593 g) with EPON 828 epoxy (408 g) and HELOXY 107 epoxy (102 g) and mixed with a Cowles mixer (Dispermat CN-10, BYK-Gardner, Columbia, Md., USA) until the mixture was homogenous. TGA measured 50.1 wt. % calcite in the resin system.

HUBERCARB Q6 calcite having a reported particle size of 6 microns (Huber Engineered Materials, Quincy, Ill.) (1538.3 g) was combined with EPON 828 epoxy resin (1006.9 g) and HELOXY 107 epoxy resin (251.7 g) in a jar. The sample was mixed with a Cowels blade for approximately 30 minutes.

Resin system "RS-8" was prepared by combining the above calcite dispersion (2239 g) with EPON 828 epoxy resin (131.2 g) and HELOXY 107 epoxy resin (32.8 g) until homogenous. TGA measured 51.7 wt. % calcite in the resin system.

A series of experimental resin systems were prepared by combining various amounts of particle-containing resin systems, RS-5, and the anhydride curative, as summarized in Table 7.

TABLE 7

Experimental resin systems (amounts in kg).

| I.D. | Resin | Amount | RS-5 | LS81K curative | Wt. % nanoparticles | Viscosity (Pa · sec) |
|---|---|---|---|---|---|---|
| R-EX10 | RS-6 | 0.45 | 1.12 | 1.30 | 8 | 1.73 |
| R-EX11 | RS-7 | 0.50 | 1.22 | 1.41 | 8 | 0.75 |
| R-CE-1 | RS-8 | 0.45 | 1.14 | 1.34 | 8 | 0.68 |

Pultrusion experiments were conducted according the Pultrusion Process with a line speed of 38.1 cm/min. The results obtained using resins systems R-EX10, R-EX11, and R-CE1 are summarized in Table 8, along with the results for R-EX8.

TABLE 8

Pull force for resin systems containing 8 wt. % calcite.

| | | | Fiber tow count | | | | |
|---|---|---|---|---|---|---|---|
| | | | 58 | 60 | 62 | 64 | 66 |
| | | | Fiber vol. % (wet basis) | | | | |
| | | | 60.1% | 62.2% | 64.3% | 66.4% | 68.4% |
| Resin | Calcite size | Visc. (Pa · sec) | Pull Force (kg force) | | | | |
| R-EX10 | 385 nm | 1.73 | 77-318 | 138-270 | 222 | — | — |
| R-EX11 | 285 nm | 0.75 | 57-115 | 81-100 | 100-173 | 152-187 | 250-344 |
| R-EX8 | 265 nm | 0.73 | — | 62-93 | 94-120 | 169-286 | — |
| R-CE1 | 6 microns | 0.68 | — | 2000 | — | — | — |

Vinyl Ester Resin Systems Containing Silica Nanoparticles.

Nalco TX10693 silica nanoparticles (1500 g) were added to a quart size jar. 1-methoxy-2-propanol (1500 g), 3-(trimethoxysilyl)propyl methacrylate (A174, 8.30 g), and polyalkyleneoxide alkoxysilane (SILQUEST A1230, 16.73 g) were combined in a separate jar. The 1-methoxy-2-propanol mixture was then added to the aqueous silica sol while stirring. A total of 13 quart size jars were made. The jars were heated to 80° C. for 16 hours. The jars were then emptied into aluminum pans and dried at 100° C.

VE-1398-5 vinyl ester resin (7643 g) was placed in a four liter stainless steel kettle. To the kettle containing the vinyl ester was added styrene (1320 g) and hindered amine nitroxide (1.53 g). A Cowles mixer (DISPERMAT CN-10, BYK-Gardner, Columbia, Md., USA) was attached to the kettle and the contents mixed. While mixing, above dried surface modified silica (5535 g) was gradually added to the kettle. Once fully mixed, the contents were transferred to another four liter kettle attached to a horizontal mill (Netzsch LABSTAR) with 0.5 mm YTZ media used at a 90% loading. The nanocomposite mixture was circulated through the mill for 165 minutes using a peristaltic pump at 250 ml/min.

Resin system "RS-9" was prepared by adding the resulting surface modified silica nanoparticles dispersed in vinyl ester resin to a 1 L round bottom flask and using rotary evaporation, styrene was removed until the final concentration of styrene was 19.1 wt. %, as measured by GC. TGA was used to determine that the resulting resin system contained 39.1 wt. % silica.

VE-1398-5 vinyl ester (6500 g) was placed in a four liter stainless steel kettle. To the kettle containing the vinyl ester was added styrene (1721 g). JAS ligand A (532 g) was preheated to 90° C. and added to the kettle. A Cowles mixer (Dispermat CN-10, BYK-Gardner, Columbia, Md., USA) was attached to the kettle and the contents mixed. While mixing, SOCAL131 nanocalcite (5318 g) was gradually added to the kettle. Once fully mixed, the contents were transferred to another four liter kettle attached to a horizontal mill (Netzsch LABSTAR) with 0.5 mm YTZ media used at a 90% loading. The nanocomposite mixture was circulated through the mill for five hours using a peristaltic pump at 250 ml/min.

The resulting surface-modified nanoparticles were dispersed in the resin system and had a mean particle size of 278 nm, and a peak particle size of 259 nm as measured by the Particle Size Procedure. The particle analysis showed a narrow particle size distribution with nearly all (at least 98%) of the particles within this peak.

Resin system "RS-10" was prepared by adding the resulting nanoparticles in vinyl ester resin to a 1 L round bottom flask and using rotary evaporation, styrene was removed until the final concentration of styrene was 18.9 wt. %, as measured by GC. TGA measured 42.7 wt. % calcite in the resin system.

A reference resin system ("RS-REF2") was prepared by combining 3.30 kg VE-1398-5 vinyl ester resin with 0.165 kg ASP400 clay.

Another reference resin system ("RS-REF3") was prepared by combining 1.97 kg VE-1398-5 vinyl ester resin with 0.59 kg ASP400 clay.

A series of experimental resin systems were prepared as summarized in Table 9. The initiators (P-16, T-121, and T-C) were combined with the styrene and added together to the resin system.

TABLE 9

Experimental vinyl ester ("VE") resin systems (amounts in kg).

| I.D. | Resins System | VE | styrene | Initiators P-16 | T-121 | T-C | I-P-24 | nanoparticles type | wt. % |
|---|---|---|---|---|---|---|---|---|---|
| R-CTL2 | 3.5 kg RS-REF2 | 0 | 0.16 | 0.01 | 0.02 | 0.01 | 0.033 | — | 0 |
| R-EX12 | 0.36 kg RS-9 | 2.36 | 0.13 | 0.008 | 0.016 | 0.008 | 0.013 | silica | 4.9 |
| R-EX13 | 1.01 kg RS-9 | 1.63 | 0.11 | 0.007 | 0.014 | 0.007 | 0.011 | silica | 14.1 |
| R-CTL3 | 2.56 kg RS-REF3 | 0 | 0.40 | 0.008 | 0.012 | 0 | 0.020 | — | — |
| R-EX14 | 2.70 kg RS-9 | 0 | 0.27 | 0.006 | 0.010 | 0 | 0.016 | silica | 35.6 |
| R-EX15 | 2.70 kg RS-10 | 0 | 0.27 | 0.006 | 0.009 | 0 | 0.018 | calcite | 38.9 |

Pultrusion experiments were conducted according the Pultrusion Process, except both 12K and 24K tow graphite fibers (GRAFIL 34-700 fiber from Grafil Inc.) were used. Up to 28 tows of the 24K fibers were used to achieve approximately 58.5 vol % fiber (wet basis) in the composite parts. For fiber volumes greater than 58.5 vol. %, additional 12K tows of the GRAFIL 34-700 graphite fiber were added individually until fiber volumes up to a maximum of 65.8 vol. % (wet basis) were achieved. The additional fibers were added as 12K tows to minimize process perturbations in the guiding and splicing operations. The results obtained using the R-CTL2, and R-CTL3 resin systems as well the experimental resin systems R-EX12 through R-EX15 are summarized in Table 11.

TABLE 11

Epoxy resin systems with a nanoparticle processing aide.

| Resin | Nanoparticles type | wt. % | Visc. (Pa · sec) | Graphite Fiber Tow | Count | Fiber Vol % | Speed (cm/min) | Pull Force (kg force) |
|---|---|---|---|---|---|---|---|---|
| R-CTL2 | — | 0 | 1.44 | 12K | 58 | 60.1 | 38.1 | 119-126 |
| R-EX12 | silica | 4.9 | 1.50 | 12K | 58 | 60.1 | 38.1 | 27-34 |
|  |  |  |  |  | 60 | 62.2 | 38.1 | 38-53 |
| R-EX13 | silica | 14.1 | 2.16 | 12K | 60 | 62.2 | 38.1 | 33-36 |
|  |  |  |  |  |  |  | 50.8 | 41-44 |
|  |  |  |  |  |  |  | 63.5 | 46-273 |
| R-CTL3 | — | 0 | 0.98 | 24K | 28 | 58.2 | 38.1 | 191-241 |
|  |  |  |  |  | 28 | 58.2 | 38.1 | 4-11 |
|  |  |  |  |  | 30 | 62.7 | 38.1 | 15-17 |
|  |  |  |  |  | 31.5 | 65.8 | 38.1 | 27-35 |
| R-EX15 | calcite | 38.9 | 1.71 | 24K* | 28 | 58.2 | 38.1 | 15-29 |
|  |  |  |  |  | 30 | 62.7 | 38.1 | 89-95 |
|  |  |  |  |  | 30.5 | 63.7 | 38.1 | 95-97 |

*28 tows of 24K fibers were combined with tows of 12K fibers. Each tow of 12K fiber is reported as 0.5 tows of 24K fibers.

Pultrusion experiments were conducted according the Pultrusion Process, except HYBON 2026 glass fibers were used instead of the graphite fibers. Twenty-eight tows of the glass fibers were used to achieve approximately 51.2 vol. % fiber (wet basis) in the composite parts. Trials were run using the R-CTL3, R-EX14, and R-EX15 at 40.6 cm/minute. The pull force for R-CTL3 (no nanoparticles) was 8.2 to 11.8 kg force. When either the silica nanoparticles (R-EX14) or calcite nanoparticles (R-EX-15) were present in the vinyl ester resin, the pull force was so low that no reading could be obtained.

Images of polished samples prepared using resin R-EX12 and 58 tows of 12K graphite fiber were obtained using scanning electron microscopy using a HITACHI S-4700 field emission scanning electron microscope (FESEM). All images were collected using backscattered electron imaging (BSEI) using the ExB filter. The ExB filter allows for BSEI imaging at low beam voltages and areas of high average atomic number will appear light in BSEI images.

Figure 3:
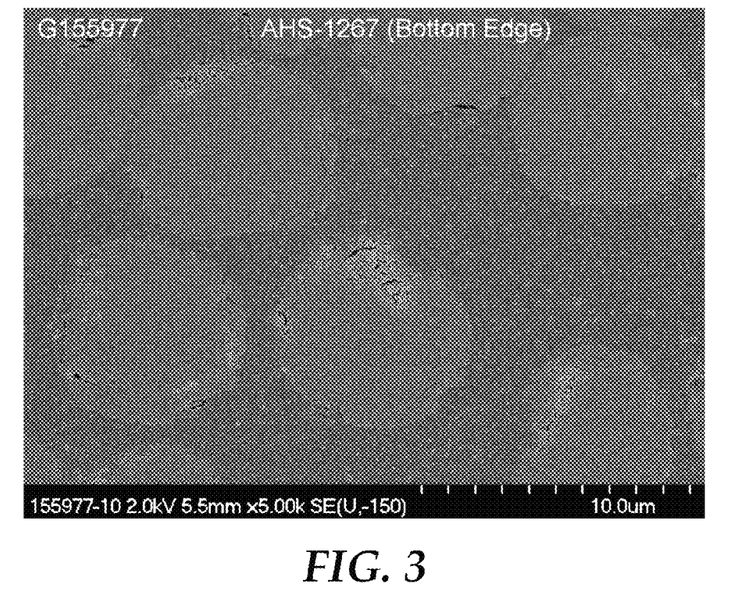
FIG. 3 is an SEM image of a pultruded part containing nanoparticles.
Figure 4:
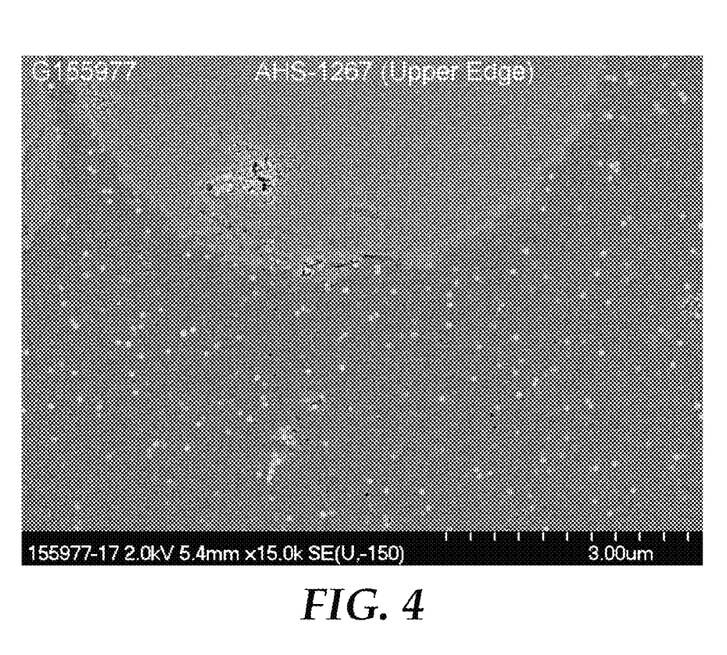
FIG. 4 is another SEM image of a pultruded part containing nanoparticles.

The polished cross-sections of the sample were sputter coated with Au/Pd for 10 seconds with a plasma current of 10 milliamps, and attached to an FESEM stub holder with carbon conductive tape. Using imaging conditions of: 2.0 KV 5.5 m WD, UHR-A, tilt=0°, ExB mode and 10 microamps of beam current; images were collected at 5000× and 15,000× magnification. FIG. 3 illustrates a cross-section of this sample at 5000× magnification showing the microparticles well dispersed in the resin surrounding the fibers. At 15,000× magnification, FIG. 4 further illustrates the uniform distribution of nanoparticles throughout the resin between the fibers.

Microscope: Hitachi S-4700 field emission scanning electron microscope. All micrographs were the result of backscattered electron imaging (BSEI) using the ExB filter. The ExB filter allows for BSEI imaging at low beam voltages. Areas of high average atomic number will appear light in BSEI images.

Various modifications and alterations of this invention will become apparent to those skilled in the art without departing from the scope and spirit of this invention.

What is claimed is:

1. A method of forming a pultruded fiber reinforced polymer composite comprising:
   impregnating continuous fibers with a resin system comprising a liquid resin and surface-modified silica nanoparticles, the resin system comprising 0.5 to 5 wt.% of the surface-modified silicia nanoparticles;
   pulling the resin-impregnated fibers through a die, and
   at least partially solidifying the resin system in the die, wherein solidifying the resin system comprises crosslinking the liquid resin;
   wherein the pultruded fiber reinforced polymer composite comprises at least 66 volume percent of the continuous fibers.

2. The method of claim 1, further comprising pulling the resin-impregnated fibers through a preforme and debulking the fibers.

3. The method of claim I, wherein the continuous fibers comprise fibers selected from the group consisting of aramid fibers, glass fibers, and carbon fibers.

4. The method of claim 1, wherein the liquid resin comprises at least one of epoxy resin, vinyl ester resin, and polyester resin.

5. The method of claim 1, wherein the resin system comprises a vinyl ester resin.

6. A pultruded fiber reinforced polymer composite made according to the method of claim 1.

* * * * *

UNITED STATES PATENT AND TRADEMARK OFFICE
CERTIFICATE OF CORRECTION

PATENT NO. : 9,682,518 B2
APPLICATION NO. : 14/886949
DATED : June 20, 2017
INVENTOR(S) : Kristin Thunhorst et al.

Page 1 of 1

It is certified that error appears in the above-identified patent and that said Letters Patent is hereby corrected as shown below:

In the Claims

Column 20
Line 13, in Claim 1, delete "silicia" and insert -- silica --, therefor.
Line 22, in Claim 2, delete "preforme" and insert -- performer --, therefor.
Line 24, in Claim 3, delete "claim I," and insert -- claim 1, --, therefor.

Signed and Sealed this
First Day of August, 2017

Joseph Matal
*Performing the Functions and Duties of the*
*Under Secretary of Commerce for Intellectual Property and*
*Director of the United States Patent and Trademark Office*